United States Patent [19]
Yamaguchi

[11] Patent Number: 5,730,675
[45] Date of Patent: Mar. 24, 1998

[54] TRANSMISSION FOR VEHICLE

[75] Inventor: Kozo Yamaguchi, Anjo, Japan

[73] Assignee: Kabushikikaisha Equos Research, Japan

[21] Appl. No.: 550,771

[22] Filed: Oct. 31, 1995

[30] Foreign Application Priority Data

Nov. 4, 1994 [JP] Japan .................. 6-293684
Feb. 16, 1995 [JP] Japan .................. 7-53347

[51] Int. Cl.⁶ .................................................. B60K 6/02
[52] U.S. Cl. .................. 475/2; 475/5; 475/151; 475/153; 477/4; 192/4 R
[58] Field of Search .................. 192/4 R; 477/4; 475/2, 5, 149, 151, 153

[56] References Cited

U.S. PATENT DOCUMENTS 5,337,848  8/1994  Bader ........................ 477/4 X
5,343,970  9/1994  Severinsky .................. 475/2 X

*Primary Examiner*—Charles A. Marmor
*Assistant Examiner*—Nathan O. Jensen
*Attorney, Agent, or Firm*—Lorusso & Loud

[57] ABSTRACT

A transmission which allows for relative rotation between an input shaft in an output shaft while lowering fuel consumption. An electric motor/generator has one element fixed to a reaction-force element of a planetary gear unit in low gear. Consequently, when the vehicle is halted, the relative rotation between the input shaft and the output shaft in the transmission can be utilized as a reaction-force to drive the motor/generator as a generator. Since electric power is generated by means of the motor/generator, the generated energy is collected and fuel consumption by the engine is reduced. In other gear stages, the motor/generator is adapted to receive the energy produced when the vehicle is decelerated by means of regenerative braking.

18 Claims, 14 Drawing Sheets

FIG. 2

| | C1 (CLUTCH 15) | C2 (CLUTCH 16) | B (BRAKE 17) | G (MOTOR 19) |
|---|---|---|---|---|
| FIRST GEAR | ○ | × | × | ◎ |
| SECOND GEAR | ○ | × | ○ | — |
| THIRD GEAR | ○ | ○ | × | — |
| REVERSE GEAR | × | ○ | × | ◎ |

○ : CONNECT
× : RELEASE
◎ : RECEIVING REACTION-FORCE
— : NON-ACTION IN SHIFTING GEARS

F I G. 1 4

○ : CONNECT
× : RELEASE
◎ : RECEIVING REACTION-FORCE
— : NON-ACTION IN SHIFTING GEARS

| | C1 (CLUTCH 15) | C2 (CLUTCH 16) | C3 (CLUTCH 18) | B (BRAKE 17) | G (MOTOR 19) |
|---|---|---|---|---|---|
| FIRST GEAR | ○ | × | × | × | ◎ |
| SECOND GEAR | ○ | × | × | ○ | — |
| THIRD GEAR | ○ | ○ | × | × | — |
| FOURTH GEAR | × | × | ○ | ○ | — |
| REVERSE GEAR | × | ○ | × | × | ◎ |

FIG. 17

|  | C1 (CLUTCH 15) | C2 (CLUTCH 16) | B1 (BRAKE 17) | B2 (BRAKE 27) | G (MOTOR 19) |
|---|---|---|---|---|---|
| FIRST GEAR | ○ | × | × | × | ◎ |
| SECOND GEAR | ○ | × | × | ○ | — |
| THIRD GEAR | ○ | × | ○ | × | — |
| FOURTH GEAR | ○ | ○ | × | × | — |
| REVERSE GEAR | × | ○ | × | × | ◎ |

○ : CONNECT
× : RELEASE
◎ : RECEIVING REACTION-FORCE
— : NON-ACTION IN SHIFTING GEARS

TRANSMISSION FOR VEHICLE

BACKGROUND OF THE INVENTION

1. Field of the Invention

The present invention relates to a transmission for a vehicle designed to save fuel consumption by an engine connected therewith.

2. Description of the Related Art

Conventionally, transmissions combine a fluid coupling with a gear change mechanism. See "Automobile Engineering" in 9 volumes, Power transmission assembly, Page 149, 150 and 215 by Editorial Committee of Automobile Engineering: Publisher; Co., Ltd. SANKAIDOH, Publication date; November 30th, 1981.

The fluid coupling assists in starting by allowing relative rotation between the engine and an output shaft of the transmission and facilitates starting and acceleration of the vehicle by increasing torque. However, when the torque is transmitted through the fluid coupling, slip between its pump and turbine reduces torque transfer efficiency, thus increasing fuel expense and lowering power performance of the vehicle.

The above disadvantages dictate consideration of a direct connection type clutch without a fluid coupling and wherein input and output shafts are directly connected. However, a direct connection clutch can not be expected to allow for relative rotation or to increase the torque. Therefore, fluid slip is required to some extent. It is known that such slip wastes energy and generates heat, thus lowering fuel efficiency.

SUMMARY OF THE INVENTION

In the light of the above problems, it is an object of the present invention to provide a transmission allowing relative rotation between the input shaft and the output shaft and reducing fuel consumption.

To attain this object, the present invention provides a transmission for a vehicle providing more than three gear stages and having an input shaft and an output shaft. The gearing of the transmission is integrated with the rotor of an electric motor/generator and includes an input element connected to the input shaft, an output element connected to the output shaft and a reaction-force element connected to the motor/generator operating as a generator when a low gear is established. The gearing may be a planetary gear unit, a bevel gear unit or the like.

According to the vehicular transmission of the present invention, in low gear the motor/generator is connected to the reaction-force element for operating in a generator mode.

Since the rotational speed of the output element is determined by the rotational speeds of the input element and the reaction-force element, the motor/generator can be operated in the generator mode if the engine rotates but the output shaft of the transmission is not rotated while the vehicle is halted. Accordingly, allowance for relative rotation between the input shaft and the output shaft must be provided.

When the torque input to the input shaft and the reaction-force of the generator balance in a manner determined by connecting relationships with the input element, the reaction-force element and the output element, the output torque of the transmission is a composite of the torque input to the input shaft and the reaction-force of the generator. Consequently, a torque larger than the input torque is output from the output shaft.

The reaction-force to the generator is converted into a driving force for the generator to generate electricity.

BRIEF DESCRIPTION OF THE DRAWINGS

FIG. 2 is a table explaining operation of frictional engagement elements in the various gear stages of the transmission and of the motor in the first embodiment;

FIG. 14 is a table explaining operation of the frictional engagement elements in various gear stages of the transmission 30 and of the motor in the third embodiment;

FIG. 17 is a table showing operation of the frictional engagement elements for various gear stages of the transmission and of the motor in the fifth embodiment.

DESCRIPTION OF THE PREFERRED EMBODIMENT(S)

(First Embodiment)

Figure 1:
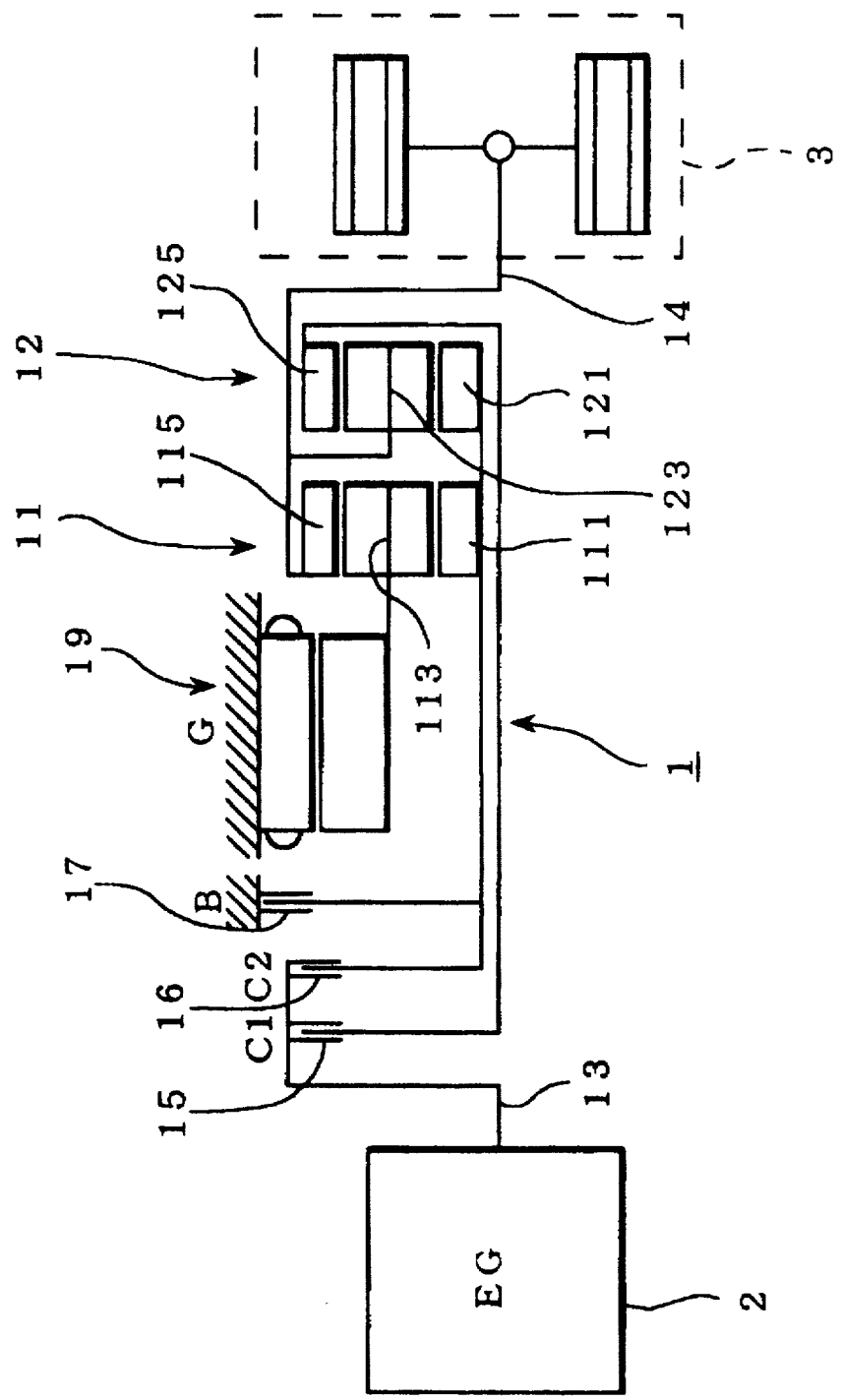
FIG. 1 is a schematic view depicting the overall structure of a first embodiment of the transmission of the present invention.

FIG. 1 is a schematic view depicting the overall structure of a first embodiment of the vehicular transmission of the present invention.

As seen in FIG. 1, the vehicular transmission 1 is arranged between an engine 2 and drive wheel unit 3 and includes a first planetary gear unit 11, a second planetary gear unit 12, a first clutch 15, a second clutch 16, a brake 17 and a motor 19, with elements of the two planetary gear units being interconnected to one another. This embodiment may be characterized as a variation of the so-called Simpson-type gear train.

The Planetary Gear Units

The first planetary gear unit 11 as shown in FIG. 1 is a single planetary gear unit which is composed of a first sun gear 111, a first carrier 113 and a first ring gear 115. The second planetary gear unit 12 is also a single planetary gear unit which is composed of a second sun gear 121, a second carrier 123 and a second ring gear 125. The second ring gear 125 is connected with an input shaft 13 driven by the engine 2 via the first clutch 15. The first sun gear 111 and the second sun gear 121 are serially connected and they are connected with the input shaft 13 via the second clutch 16, while connected with the case (not shown) of the transmission 1 via the brake 17. The first ring gear 115 and the second carrier 123 are connected in series with an output shaft 14 leading to the drive wheel unit 3.

Incidentally, the aforementioned clutches and brake are of the wet-friction type and are adapted to reciprocally connect and release hydraulically by operation of a piston which receives hydraulic pressure from a hydraulic pump (not shown) which, in turn, is driven by the engine 2.

Motor 19

The motor/generator 19 functions both as a generator and as an electric motor. The motor/generator 19 is composed of a magnet stator mounted on an internal surface of a case and a rotor, the rotor being connected with the first carrier 113. In this first embodiment, a motor control system, which will be described in more detail later, is designed so as to control the motor/generator to rotate with normal (motor mode) or reverse rotation (generator mode).

Gearing

FIG. 2 is a table explaining operation of frictional engagement elements C1, C2 and B in establishing various gear stages of the above-mentioned transmission and operation of the motor. As shown in FIG. 2, when in first gear (low gear), the first clutch 15 is engaged while the second clutch 16 and the brake 17 are released, whereby the motor (generator) 19 is driven by a reaction-force, as will be described later.

In the second gear, the first clutch 15 and the brake 17 are connected and the second clutch 16 is released.

In the third gear, the clutches 15, 16 are connected and the brake 17 is released.

In the reverse gear (low gear), the second clutch 16 is connected and the first clutch 15 and the brake 17 are released. In this case, the motor/generator 19 is also driven by reaction-force.

Figure 3:
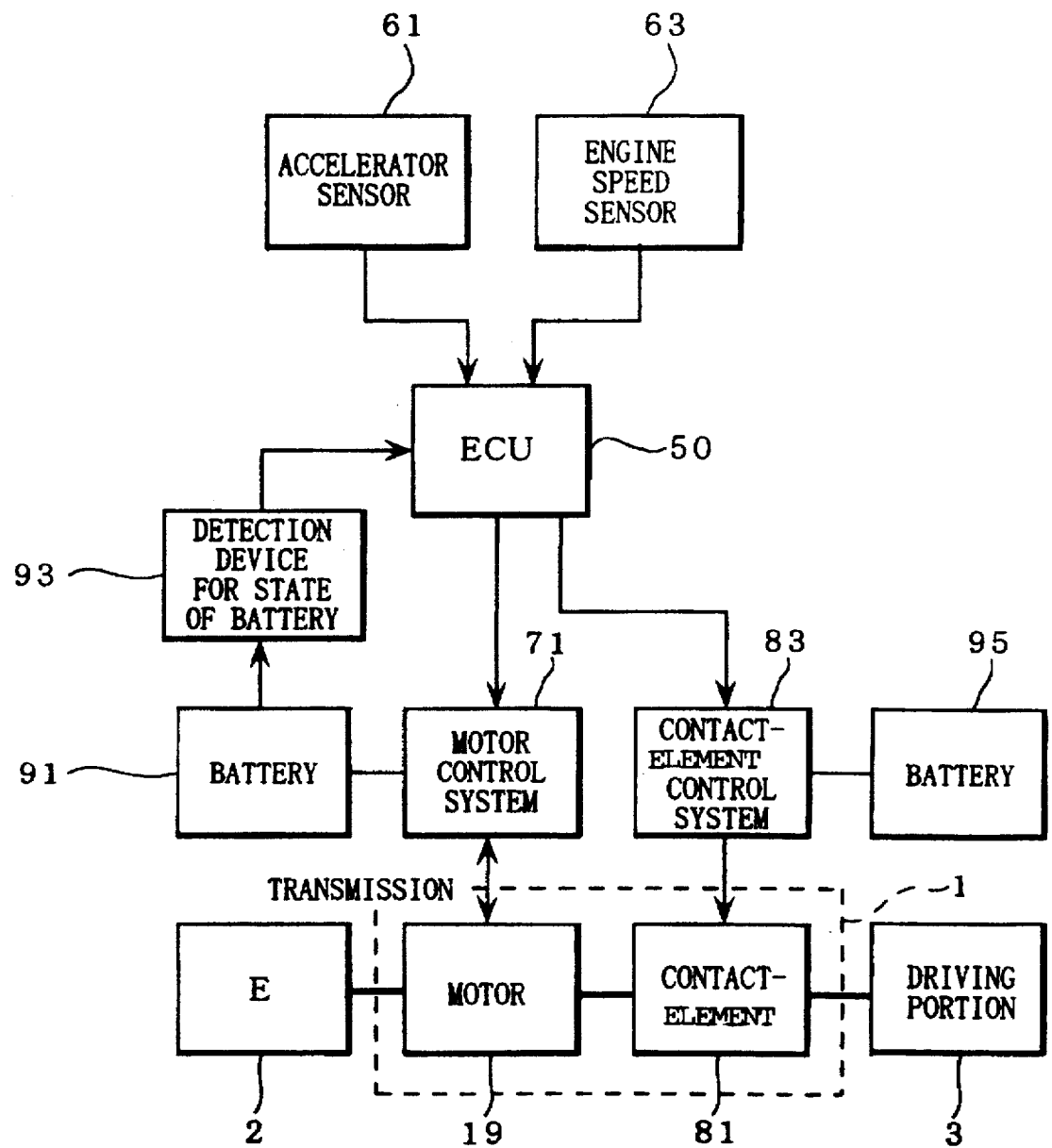
FIG. 3 is a block diagram of the control system for the transmission of the first embodiment.

FIG. 3 illustrates a block diagram of a control system for the above-described transmission. As shown in the drawing, the control system is mainly composed of an electronic control unit (ECU) 50 having input ports which receive output signals from an accelerator pedal sensor 61 for detecting movement of an accelerator pedal and signals from an engine sensor 63 for detecting engine speed. Output ports of the ECU 50 are connected to a motor control system 71 controlling the motor 19 and to a hydraulic control system 83 which controls frictional engagement elements 81 inclusive of brakes and clutches.

The motor control system 71 works to supply electric power from a battery 91 to the motor/generator 19 (operating as a motor) and returns regenerated electric power from the motor/generator 19 (acting as a generator) to the battery 91. The battery 91 is provided with a detection device 93 for detecting the residual charge of the battery. The hydraulic control system 83 maintains oil pressure from the hydraulic source at a predetermined level in order to supply oil to the appropriate frictional engagement elements by switching oil channels by means of a solenoid valve or the like. Actuators of the hydraulic control system 83 are supplied with electric power from a battery 95 separate from and in addition to the battery 91.

Low Gear

Figure 4:
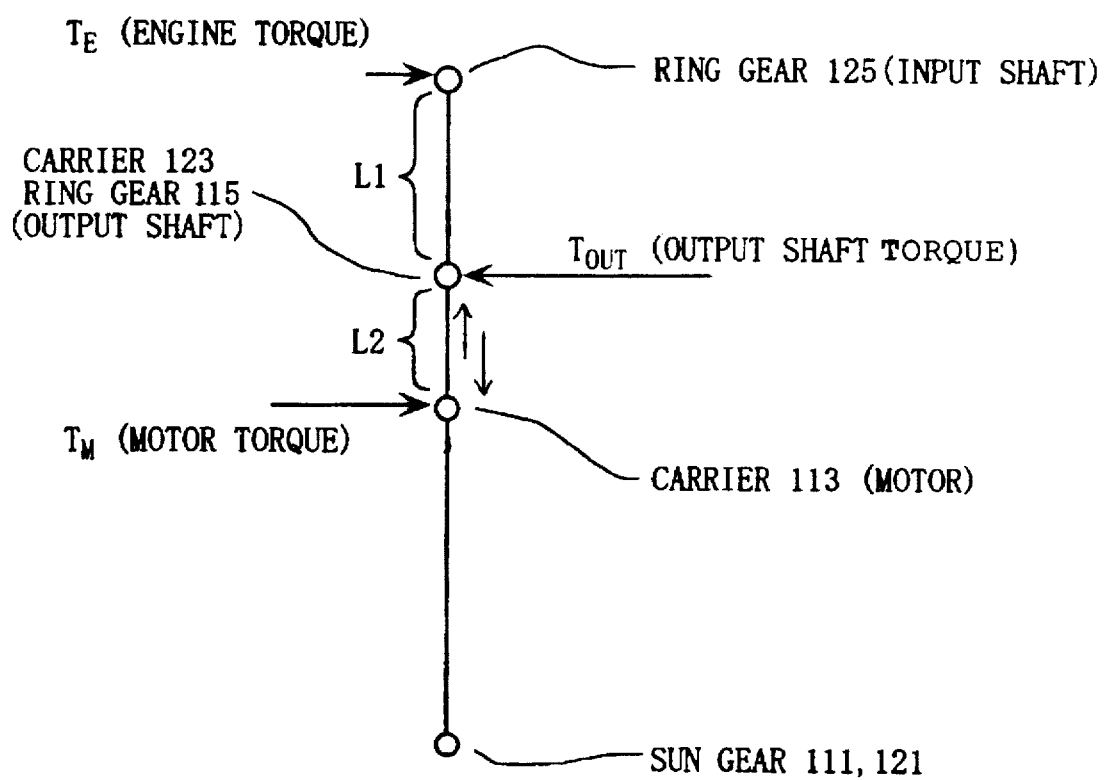
FIG. 4 is a schematic diagram showing torque transfer relationships between the input element, the output element and the reaction-force element with low gear established in the planetary gear unit of the first embodiment.
Figure 5:
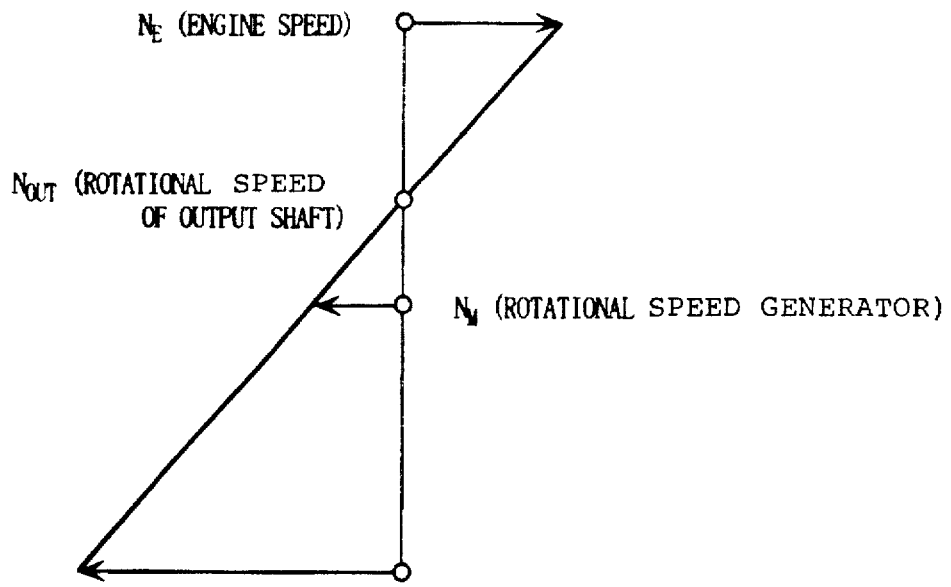
FIG. 5 is a diagram describing the relationship between the engine speed and the rotational speed of the generator, without rotation of the output shaft in the forward low gear in the first embodiment.

FIG. 4 is a schematic diagram showing torque transfer between an input element, an output element and a reaction-force element when low gear is selected. FIG. 4 shows four torque transfer elements in due order from the top on the drawing. The uppermost element is the second ring gear 125, the second from the top is the first ring gear 115 and the second carrier 123, the third is the first carrier 113 connected to the motor/generator 19 and the fourth consists of the first and second sun gears 111, 121.

In low gear, the second ring gear 125 of the above-structured gear train is the input element connecting with the input shaft 13 for input of engine torque, while the first ring gear 115 and the second carrier 123 function as the output element connecting the output shaft 14 and the first carrier 113 connected to the motor/generator 19 serves as the reaction-force element.

In low gear, when the engine torque and the reaction-force torque generated by the generator work in the same direction, the output torque is produced in the opposite direction. When the engine torque×L1 is equal to the generator torque×L2, the output torque is a composite of the engine torque and the generator torque.

In this embodiment, force received by the motor in a direction opposite the direction of rotation of the rotor in the motor mode is employed as the reaction-force. Several methods are available for adjusting the reaction-force, for example, field current may be adjusted when a shunt motor is employed, or current or voltage to a stator coil may be adjusted when a permanent magnet is employed for the rotor. The electric motor (generator) may be either an AC motor or a DC motor.

FIGS. 5–8 illustrate relationships between the engine speed, rotational speed of the motor/generator and rotational speed of the output shaft in the low gear. When the engine 2 (the input shaft 13) rotates but the output shaft 14 does not rotate when the vehicle is halted, or when the output shaft does not rotate because the engine torque is offset by the reaction-force torque of the motor/generator, the motor/generator rotates reverse to the normal direction of rotation of the motor to generate a voltage (see FIG. 5). Briefly, the engine torque is utilized as a generating torque.

The vehicle naturally can move when the output torque of the vehicle produces a force larger than running resistance. And when the output torque reaches a sufficient force to enable the output shaft 14 to rotate, if the engine speed remains at the same speed when the vehicle is halted, the reverse rotational speed of the motor becomes lower (see FIG. 6).

While various methods of controlling the reaction-force torque can be employed, the present embodiment employs a method which controls the reaction-force torque of the generator responsive to the relationship between the engine speed and extent of depression of the accelerator pedal. More specifically, when the actual engine speed is larger than an engine speed defined predetermined to correspond to the degree of depression of the accelerator pedal, the reaction-force torque is recognized to be small in comparison with the engine torque, so that the reaction-force torque is increased. On the other hand, when the actual engine speed is smaller than the engine speed predetermined to correspond to the degree of depression of the accelerator pedal, the reaction-force torque is recognized to be large in comparison with the engine torque, so that the reaction-force torque is decreased.

Controlling the reaction-force of the motor 19 to become larger in proportion to an increase in the engine torque, the direction of rotation of the motor/generator is changed from the reverse direction to the normal direction with passage through the zero point (see FIGS. 7 and 8) and the brake 17 is operated to stop rotation of the sun gears to thereby shift from the first gear to the second gear. As can be seen from FIG. 2, the brake 17 is engaged in the second gear. Since the sun gear has already stopped rotating, no shock will occur due to shifting.

Second and Third Gear States

On shifting into the second gear or the third gear, the output of the motor/generator 19 becomes parallel to that of the engine 2 in order to generate a sufficient driving force by combining outputs of the motor and the engine. In this sense, the motor/generator 19 assists the engine 2. In such a combination, the generated energy collected upon starting the vehicle can be utilized, which will save fuel consumption by the engine.

Since the energy produced when the vehicle is decelerated can be regenerated by the motor/generator 19, operating as a generator, fuel consumption may be economized. In keeping with this objective, the motor/generator 19 may be used as a generator receiving the driving force of the engine 2.

Figure 9:
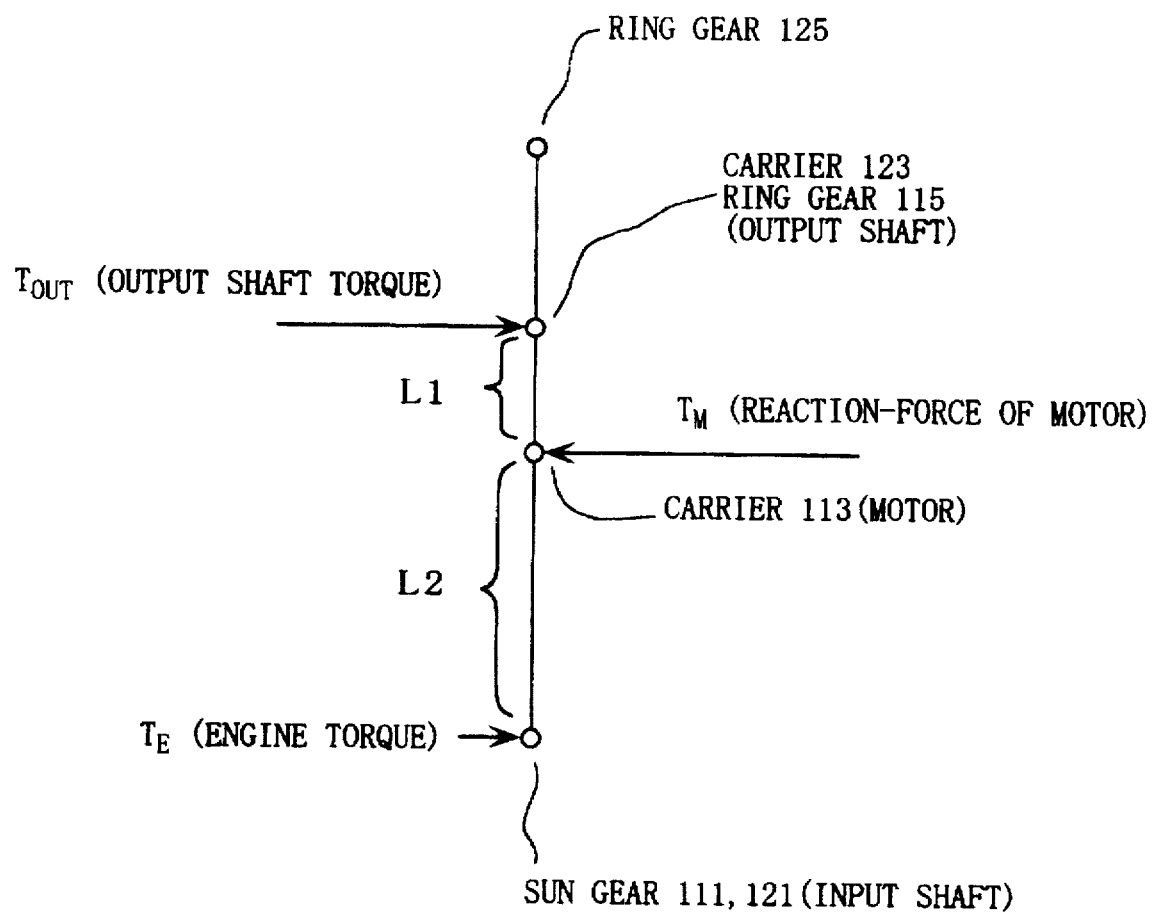
FIG. 9 is a schematic diagram showing torque transfer between the input element, the output element and the reaction-force element in reverse gear of the first embodiment.

As shown in FIG. 9, with the above-described gear train in reverse gear, the first sun gear 111 and the second sun gear 121, which are connected to the engine 2 (the input shaft 13), serve as the input element, the second carrier 123 and the first ring gear 115, which are connected to the output shaft 14, serve as the output element, and the carrier 113 connected to the motor/generator 19 serves as the reaction-force element.

In this gear train, the reaction-force of the motor/generator is opposed to the direction of the engine torque, and the output torque is the reverse of the normal direction produced while the vehicle is driven forward.

In the reverse gear, when the output torque×L1 is equal to the engine torque×L2, the reaction-force of the motor is combined with the output torque of the engine.

Figure 10:
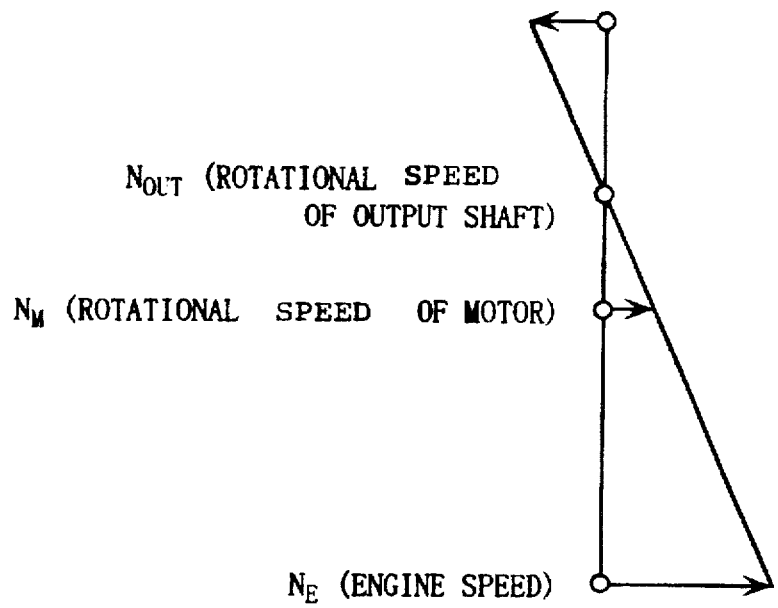
FIG. 10 is a diagram describing the relationship between the engine speed and the rotational speed of the motor, without rotation of the output shaft, in the reverse gear of the first embodiment.

As can be seen from FIG. 10, when the output shaft 14 does not rotate but the input shaft 13 rotates, the motor/generator 19 rotates reverse to the normal direction of rotation. In such a situation the motor/generator is not operated as an electric motor but, rather, as a generator.

Figure 11:
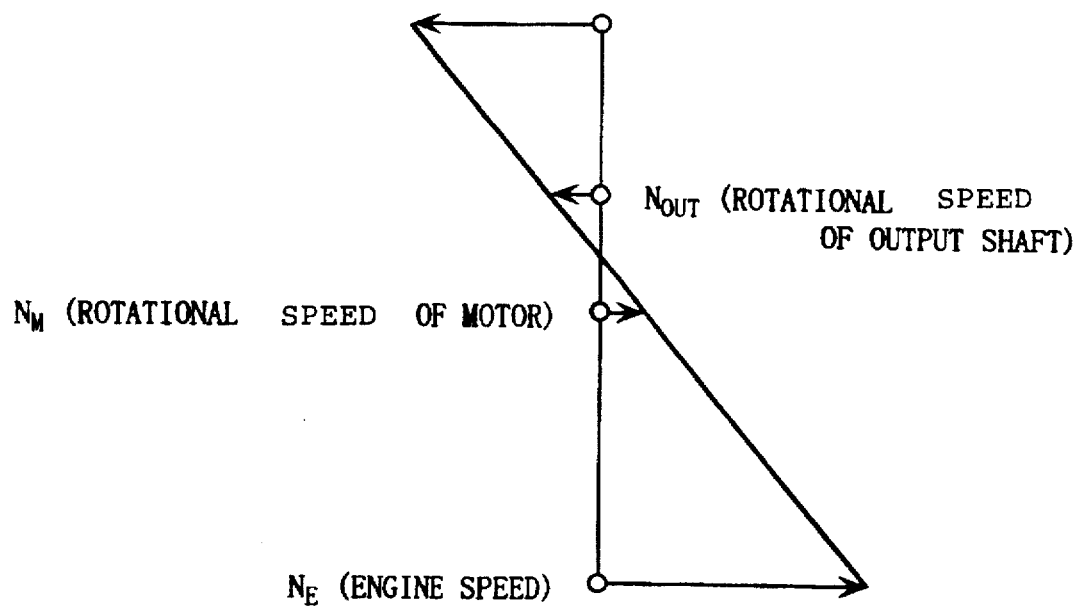
FIG. 11 is a diagram describing the relationship between the engine speed and the rotational speed of the motor, with rotation of the output shaft in the reverse gear of the first embodiment.

The rotational speed of the output shaft 14 is determined by the engine speed (the input shaft 13) and the reverse rotational speed of the motor/generator 19 (FIG. 11).

Figure 6:
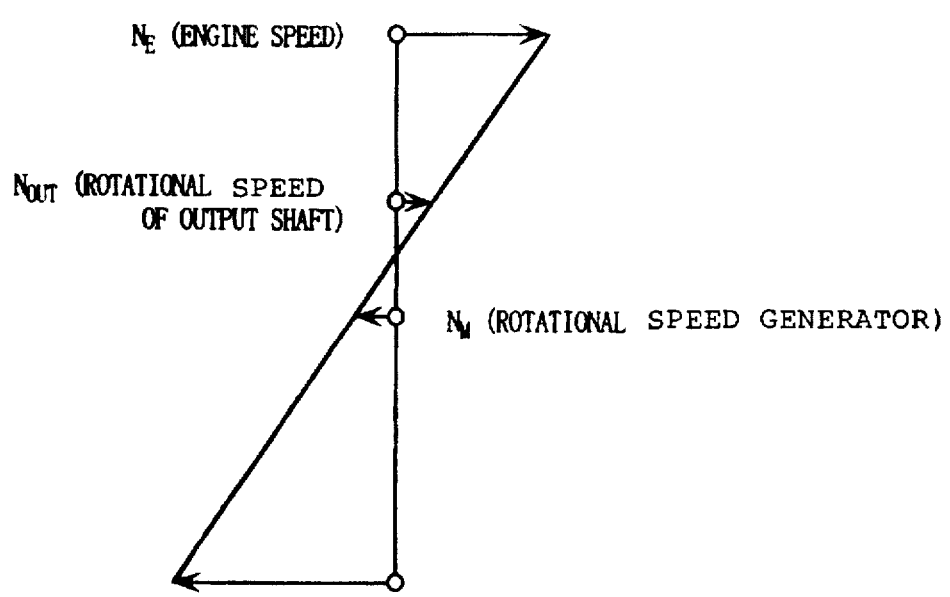
FIG. 6 is a diagram describing the relationship between the engine speed, the rotational speed of the generator and the rotational speed of the output shaft in the forward low gear in the first embodiment.
Figure 7:
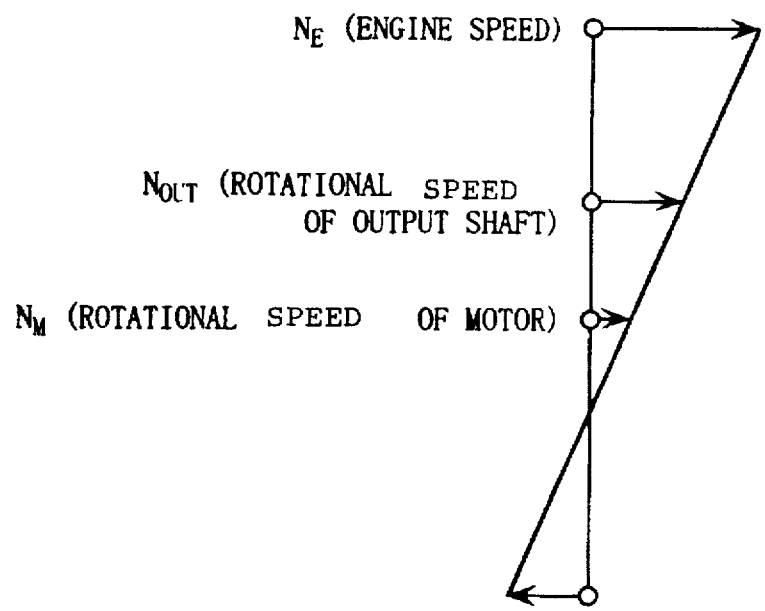
FIG. 7 is a diagram describing the relationship between the engine speed, a low rotational speed of the motor and the rotational speed of the output shaft in the forward low gear in the first embodiment.
Figure 8:
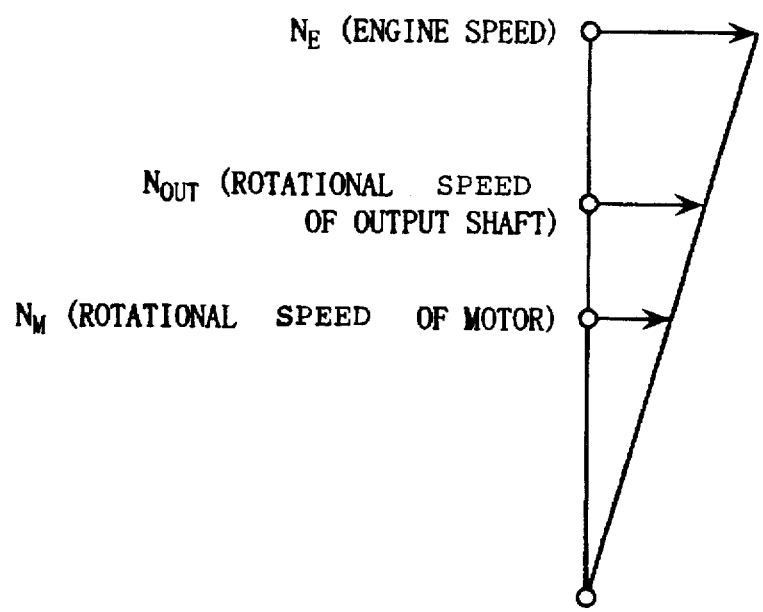
FIG. 8 is a diagram describing the relationship between the engine speed, a higher rotational speed of the motor and the rotational speed of the output shaft in the forward low gear in the first embodiment.

In the above-described first embodiment, a generator having solely the function of generating electricity can be utilized instead of the motor/generator 19. In this case, since the reaction-force is generated in both directions, before changing the rotational direction of the motor/generator 19 as shown in FIGS. 6 and 7, namely approaching a specific ratio of engine speed to the rotational speed of the output shaft, it is required that the brake be activated when shifting into the second gear.

The motor/generator 19 is employed as the reaction-force element in low speed of the first gear and of the reverse gear in the above-described first embodiment, however it may be used as the reaction-force element in the low speed of the three forward gear ranges if the first clutch 15 is eliminated from the transmission 1. Such a modification, can provide a transmission for a "FF" (front-wheel-engine front-wheel-drive) vehicle, in which the transmission having the above three forward gears stages is mounted on a first shaft, a sub-transmission, which changes between the forward and reverse gear stages and shifts between forward gear stages, is provided on a second shaft and a differential is provided on a third shaft.

(Second Embodiment)

Figure 12:
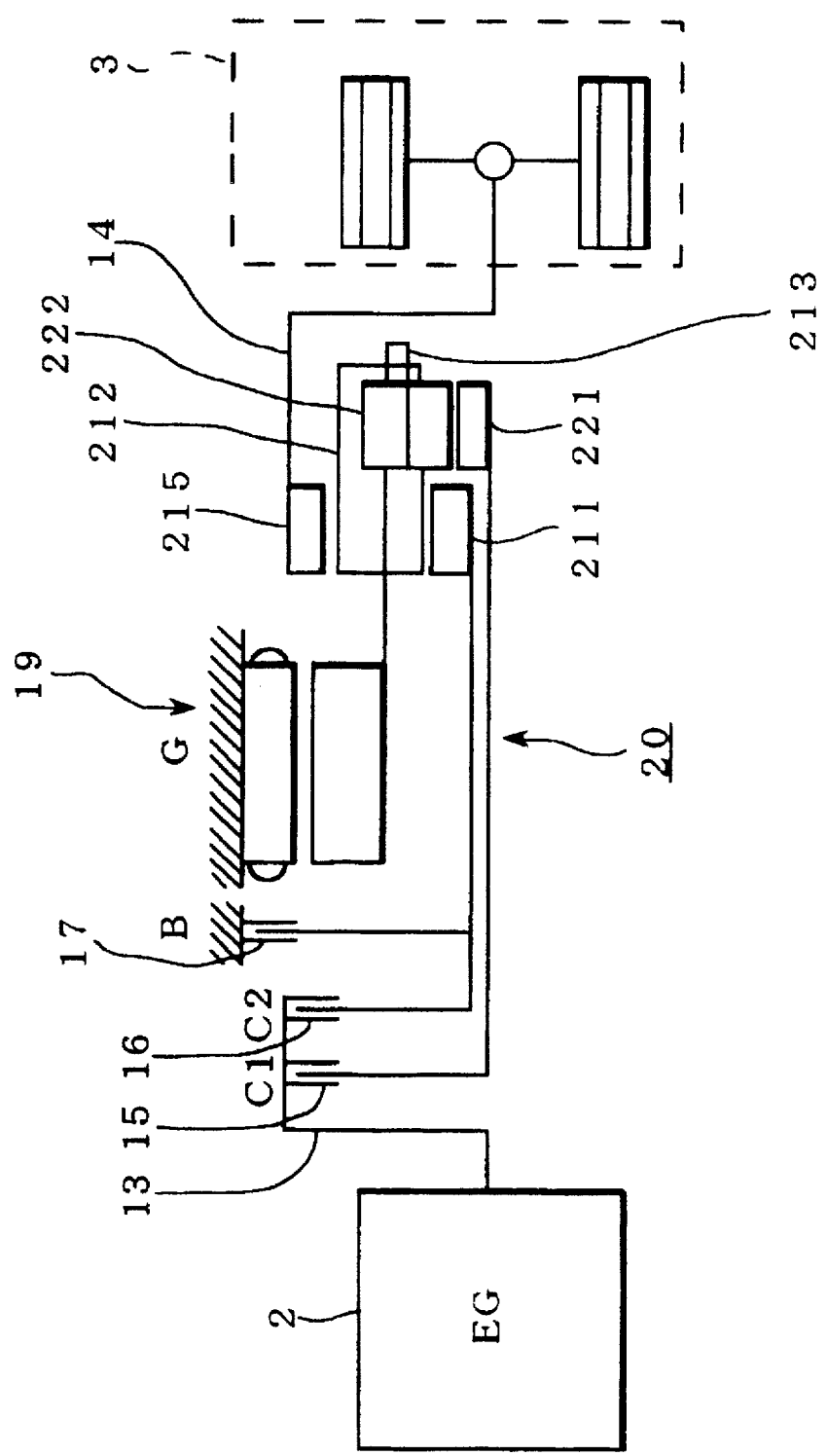
FIG. 12 is a schematic view depicting the overall structure of a second embodiment of the transmission.

FIG. 12 is a schematic view depicting the overall structure of a second embodiment of a transmission of the present invention. As can be seen from the drawing, the vehicular transmission 20 according to the second embodiment has a so-called Ravigneaux-type gear train and has a structure different from the gear train of the first embodiment, but the systematic operation of the clutch, brake and motor are the same. More specifically, the gear train has a single planetary gear unit composed of a first sun gear 211, a long carrier-pinion 212 and a ring gear 215 in a first line and, arranged in a second line, a double-pinion gear having the carrier-pinion in common with the first line. There is a short carrier-pinion 222 engaged with the long carrier-pinion 212 and a second sun gear 221 in the second line. The sun gear 211 is connected to the brake 17 and with the input shaft 13 via the second clutch 16. The second sun gear 221 is connected with the input shaft 13 via the first clutch 15. The ring gear is connected to the output shaft 14 and the carrier 213, which carries the carrier-pinions 212, 222 mounted for relative rotation, is connected to the motor/generator 19. The systematic operation of the first clutch 15, the second clutch 16, the brake 17 and the motor 19 of the transmission 20 in the second embodiment is the same as in the first embodiment (see FIG. 2–FIG. 11).

(Third Embodiment)

Figure 13:
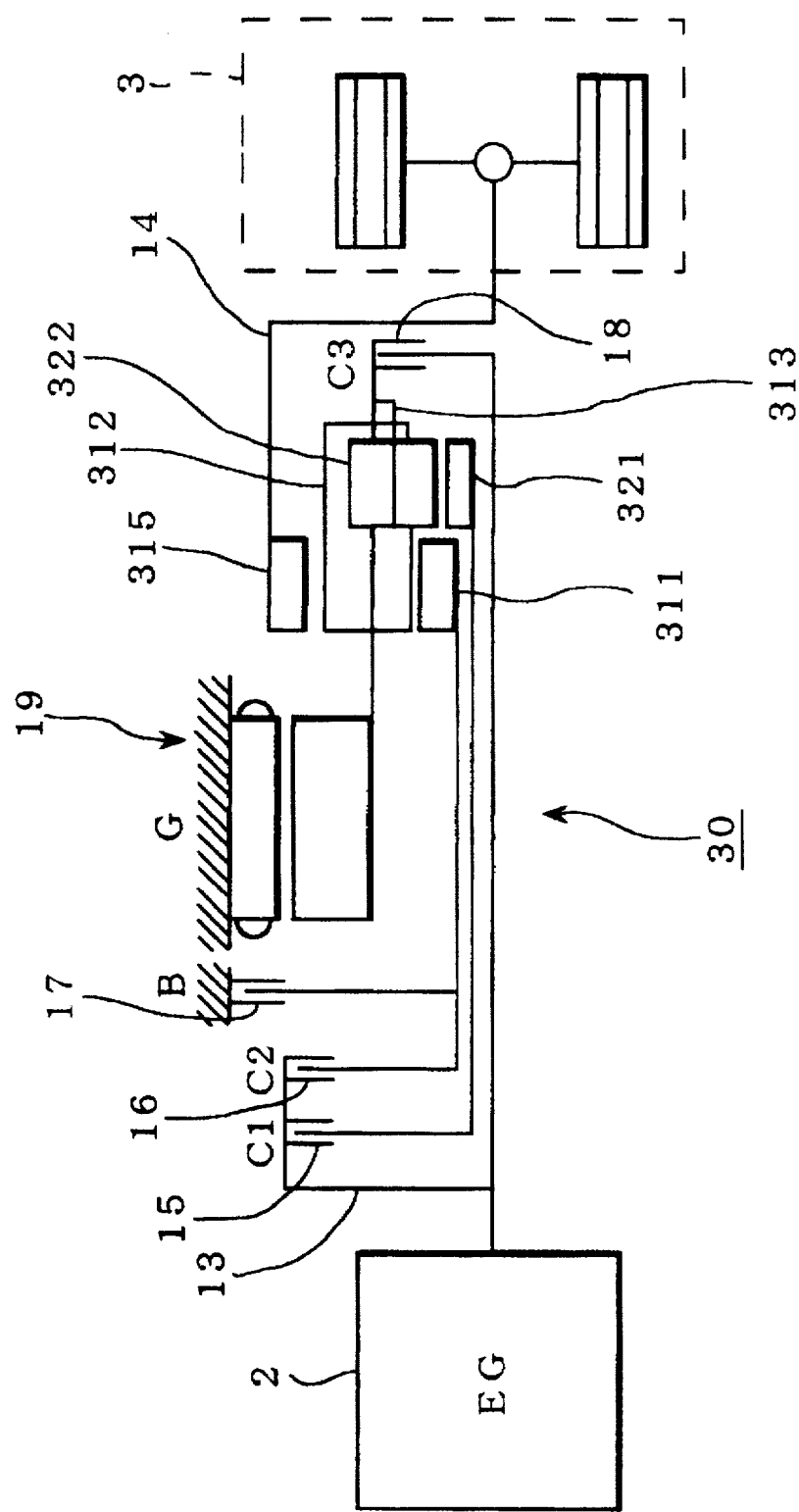
FIG. 13 is a schematic view depicting the overall structure of a third embodiment of the transmission.

FIG. 13 is a schematic view depicting the overall structure of a third embodiment of the transmission of the present invention. As shown in the drawing, the vehicular transmission 30 according to the third embodiment further includes a third clutch 18 for connecting and releasing the carrier 313 to and from the input shaft 13 in order to shift between four forward gear stages. In the planetary gearing of this third embodiment sun gear 311, long carrier-pinion 312, carrier 313, ring gear 315, sun gear 321 and short carrier-pinion 322 correspond, respectively, to elements 211, 212, 213, 215, 221 and 222 in the second embodiment shown in FIG. 12.

FIG. 14 is a table explaining systematic operation of frictional engagement elements in the various gear stages of the above-described transmission 30 and of the motor. As can be seen from the table, in the first, second, third and reverse gear stages, the third clutch 18 is released and the remainder of the functions are as in the first embodiment. In the fourth gear stage, the first clutch 15 and the second clutch 16 are released and the third clutch 18 and the brake 17 are engaged.

(Fourth Embodiment)

Figure 15:
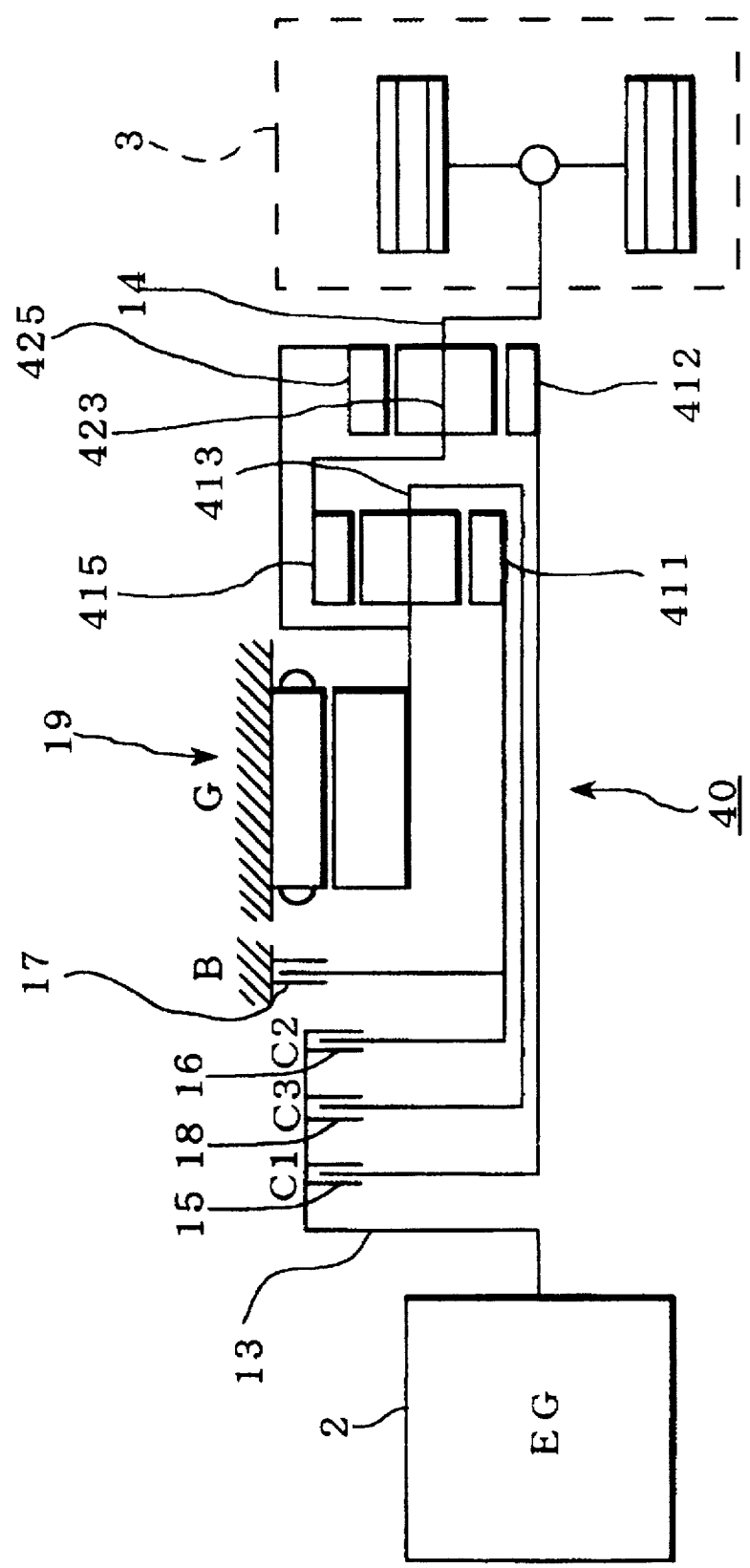
FIG. 15 is a schematic view depicting the overall structure of a fourth embodiment of the transmission.

FIG. 15 is a schematic view depicting the overall structure of a fourth embodiment of the transmission of the present invention. The transmission 40 in the fourth embodiment includes the two single planetary gear units in two lines, each composed of a sun gear, a carrier and a ring gear. A first sun gear 411 in the first line is connected to the brake 17 and is also connected with the input shaft 13 via the second clutch 16. A second sun gear 412 in the second line is connected with the input shaft 13 via the first clutch 15. A first ring gear 415 in the first line is connected to a second carrier 423 in the second line and they are connected to the output shaft 14. A first carrier 413 in the first line is connected to a second ring gear 425 in the second line and they are connected with the input shaft 13 via the third clutch 18 and with the motor/generator 19 as the reaction-force element in the low gear.

The systematic operation of the frictional engagement elements and of the motor of the transmission according to the fourth embodiment are the same as in the third embodiment.

(Fifth Embodiment)

Figure 16:
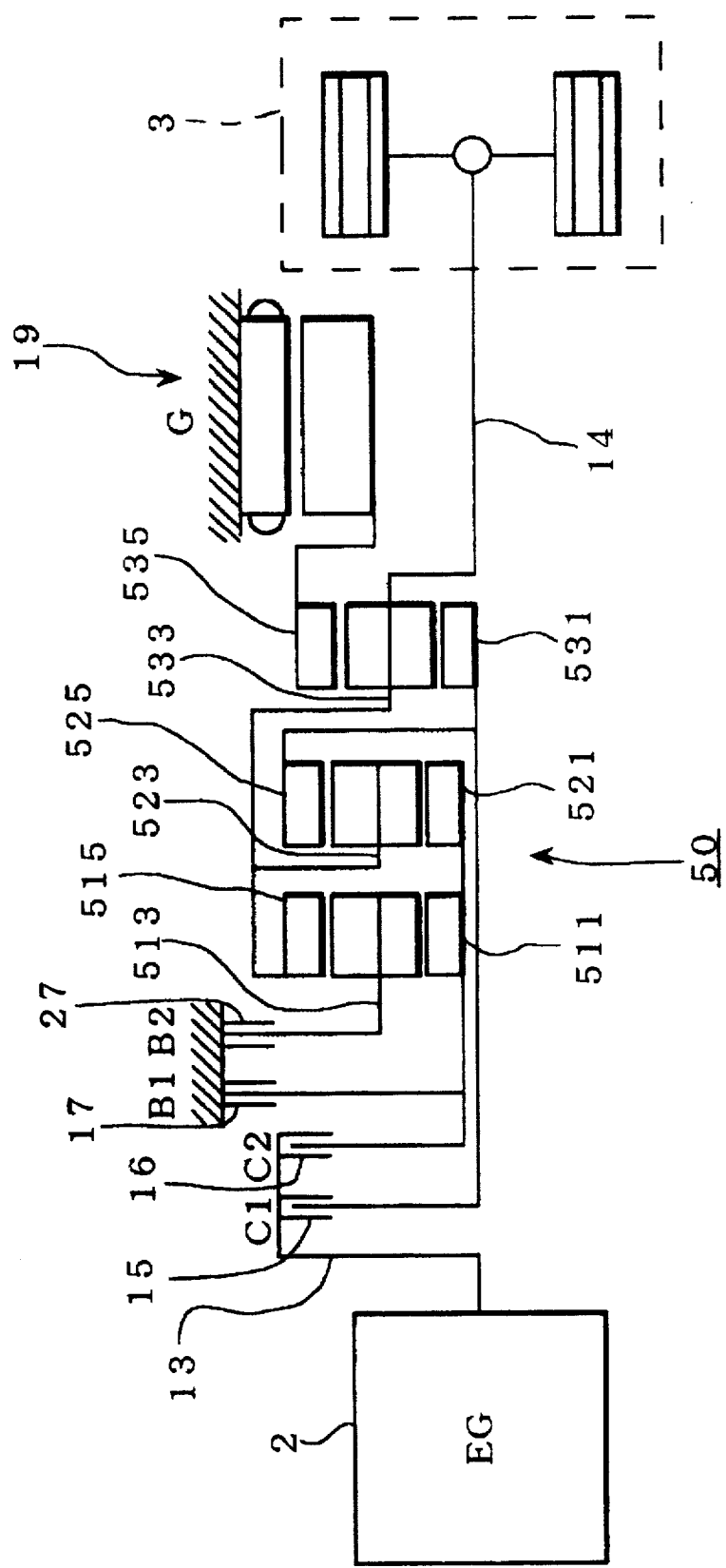
FIG. 16 is a schematic view depicting the overall structure of a fifth embodiment of the transmission.

FIG. 16 is a schematic view of the overall structure of the vehicular transmission of the fifth embodiment of the present invention. As shown in the drawing, the transmission in the fifth embodiment provides four forward gear stages by addition of a single planetary gear unit to the Simpson-type planetary gear train of the first embodiment. A second ring gear 525 in the second line and a third sun gear 531 in the third line are connected together and with the input shaft 13 via the first clutch 15. A first sun gear 511 in the first line and a second sun gear 521 in the second line are serially connected and they are both connected to the first brake 17 and further connected with the input shaft 13 via the second clutch 16. A first carrier 513 in the first line is connected to the second brake 27. A ring gear 515 in the first line, a second carrier 523 in the second line and a third carrier 533 in the third line are connected in series to the output shaft 14. And a third ring gear 535 in the third line is connected to the motor 19.

FIG. 17 is a table explaining systematic operation of the frictional engagement elements in the various gear stages of the above-described transmission 50 and operation of the motor. As shown in the drawing, when in first gear (low gear), the first clutch is engaged while the second clutch 16, the first brake 17 and the second brake 27 are released, and the motor/generator 19 functions as the reaction-force element as in the previously described embodiments.

In the second gear, the first clutch 15 and the second brake 27 are engaged and the second clutch 16 and the first brake 17 are released.

In the third gear, the first clutch 15 and the first brake 17 are engaged and the second clutch 16 and the second brake 27 are released.

In the fourth gear, the first clutch 15 and the second clutch 16 are engaged and the first brake 17 and the second brake 27 are released.

In the reverse gear, the second clutch 16 is engaged and the first clutch 15, the first brake 17 and the second brake 27 are released. In this embodiment also, the motor/generator 19 functions as a reaction-force element.

As described above, the vehicular transmission in the first through fifth embodiments has the motor/generator 19 connected as a reaction-force element in low gear. Therefore, when the vehicle is halted, the input rotation of the transmission is maintained at least at idling speed by adjusting the reaction-force of the motor 19, so that the engine will not stall, while allowing for relative rotation between the input and output shafts of the transmission.

It is important that the transmission can provide a driving force to the driving-wheels to hold the vehicle at a halt on an ascent and that it can provide a function similar to the creep of a torque converter.

The motor/generator 19 is adapted to be driven as a generator so as to generate electric power by means of the reaction-force torque. In other words, the motor/generator 19, operating in the generator mode regenerates electric power by means of the reaction-force torque and returns the thus—regenerated electric power to the battery.

When the torque input to the input shaft and the reaction-force of the generator are in balance, the output torque of the transmission is the sum of the torque input to the input shaft and the reaction-force of the generator. Consequently, even when the engine torque is larger than the output torque, the vehicle can move, and the vehicle will start smoothly.

Since the motor/generator 19 may be driven as a generator, it is possible to collect most of the energy which is consumed as heat when the conventional fluid coupling is employed.

Since the engine 2 and the motor/generator 19 are in parallel in terms of supply of driving force to the output shaft, in second gear and higher, the energy produced when the vehicle is decelerated can be recovered by means of regenerative braking to economize fuel consumption. The engine can thus be operated within a range of maximum efficiency, with the result that the exhaust gas will be cleaner and the vehicle will be more environmentally acceptable.

With motor 19 capable of switching to operation as a generator, shock due to shifting from the first gear to the second gear will rarely be experienced. Therefore, the respective ranges of the first and second gear stages can be extended.

By adjusting the reaction-force of the generator, it is possible to generate electric power by means of the reaction-force while allowing relative rotation between the input shaft and the output shaft. Consequently, the engine may remain running at high efficiency so as to generate electric power by driving the generator, even when the vehicle is halted. Moreover, in the forward low gear of the transmission, the vehicle can be halted without rolling backward on an incline.

With the present invention it is also possible to recover energy from the conventional fluid coupling as electric power. More specifically, the energy conventionally consumed as heat by fluid flow in the conventional fluid coupling can be collected and stored as electricity. Therefore, the load of the engine can be reduced by the amount of such energy so collected and stored to further reduce fuel consumption.

From the standpoint of transmission of driving force, in gear stages providing a parallel relationship between the engine and the motor, in relation to the output shaft, the brake energy is collected by the generator and stored when the vehicle is decelerated, so that it stands to reason that the vehicle can be driven with reduced fuel expense.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. A transmission for a vehicle having an engine and electric power storage means, said transmission comprising:
   an input shaft driven by the engine;
   an output shaft;
   a generator including a rotor; and
   planetary gear means for establishing a plurality of gear stages including a reverse gear stage, a low gear stage and higher gear stages, and for operating as a differential gear unit in said low gear stage, said planetary gear means including an input element connected to said input shaft, an output element connected to said output shaft and a reaction element connected to said rotor.

2. A transmission in accordance with claim 1 wherein said planetary gear means comprises:
   a first single planetary gear unit comprising a first sun gear, a first carrier and pinion gear and a first ring gear;
   a second single planetary gear unit comprising a second sun gear, a second carrier and pinion gear and a second ring gear, said second ring gear being connected to said input shaft for rotation therewith;
   wherein said first sun gear and said second sun gear are connected in series for rotation together and are connectable to said input shaft through a first clutch;
   wherein said first ring gear and said second carrier and pinion gear are connected in series to said output shaft, and
   wherein said rotatable reaction element is said first carrier and pinion gear.

3. A transmission in accordance with claim 2 further comprising:
   a second clutch interposed between said second ring gear and said input shaft.

4. A transmission in accordance with claim 1 wherein said planetary gear means comprises:
   a planetary gear unit including a first sun gear, a long pinion meshed with said first sun gear, a short pinion and a ring gear engaged with said long pinion and a second sun gear engaged with said short pinion;
   wherein said transmission further comprises a first clutch interposed between said second sun gear and said input shaft and a second clutch interposed between said first sun gear and said input shaft;
   wherein said ring gear is fixed to said output shaft for rotation therewith; and
   wherein said long pinion and said short pinion are mounted on a common carrier and said carrier is said rotatable reaction force element.

5. A transmission in accordance with claim 4 further comprising a third clutch for connecting said common carrier to said input shaft.

6. A transmission in accordance with claim 1 wherein said planetary gear means comprises:
   a first single planetary gear unit including a first sun gear, a first pinion and carrier and a first ring gear and a second single planetary gear unit including a second sun gear, a second pinion and carrier and a second ring gear;
   a first clutch for selectively engaging said second sun gear with said input shaft;
   a brake for selectively locking said first sun gear against rotation;
   a second clutch for selectively engaging said first sun gear with said input shaft;
   a third clutch for selectively connecting said first carrier and said second ring gear to the input shaft;
   wherein said first ring gear and said second carrier are connected in series to said output shaft; and
   wherein said rotatable reaction element is said first carrier, said first carrier being connected to said second ring gear for rotation therewith.

7. A transmission in accordance with claim 1 wherein said planetary gear means comprises a first single planetary gear unit including a first sun gear, a first carrier and pinion and a first ring gear, a second single planetary gear unit including a second sun gear, a second carrier and pinion and a second ring gear and a third single planetary gear unit including a third sun gear, a third carrier and pinion and a third ring gear;
   wherein said transmission further comprises:
   a first clutch for selectively connecting said second ring gear and said third sun gear to said input shaft, said second ring gear and said third sun gear being interconnected for rotation together;
   a brake for locking said first and second sun gears against rotation, said first and second sun gears being coaxial and interconnected for rotation together;
   a second clutch for selectively connecting said first and second sun gears to said input shaft;
   a second brake for locking said first carrier against rotation;
   wherein said first ring gear, said second carrier and pinion and said third carrier and pinion are connected in series to said output shaft; and
   wherein said rotatable reaction element is said third ring gear.

8. A transmission in accordance with claim 1, wherein said planetary gear means functions in the reverse gear stage as a differential gear system.

9. A transmission for a vehicle having an engine and electric power storage means, said transmission comprising:
   an input shaft driven by the engine;
   an output shaft;
   an electric motor including a rotor; and
   planetary gear means for establishing a plurality of gear stages including a reverse gear stage, a low gear stage and higher gear stages, and for operating as a differential gear unit in said low gear stage, said planetary gear means including an input element connected to said input shaft, an output element connected to said output shaft and a reaction element connected to said rotor.

10. A transmission in accordance with claim 9, wherein said planetary gear means functions in the reverse gear stage as a differential gear system.

11. A transmission for a vehicle having an engine and electric power storage means, said transmission comprising:
    an input shaft driven by the engine;
    an output shaft;
    an electric motor/generator capable of operating in a first mode as a motor and in a second mode as a generator, said motor/generator including a rotor; and
    planetary gear means for establishing a plurality of gear stages including a reverse gear stage, a low gear stage and higher gear stages, and for operating as a differential gear unit in said low gear stage, said planetary gear means including an input element connected to said input shaft, an output element connected to said output shaft and a reaction element connected to said rotor.

12. A transmission in accordance with claim 11, wherein said planetary gear means functions in the reverse gear stage as a differential gear system.

13. A transmission in accordance with claim 11 wherein said planetary gear means comprises:
   a first single planetary gear unit comprising a first sun gear, a first carrier and pinion gear and a first ring gear;
   a second single planetary gear unit comprising a second sun gear, a second carrier and pinion gear and a second ring gear, said second ring gear being connected to said input shaft for rotation therewith;
   wherein said first sun gear and said second sun gear are connected in series for rotation together and are connectable to said input shaft through a first clutch;
   wherein said first ring gear and said second carrier and pinion gear are connected in series to said output shaft, and
   wherein said rotatable reaction element is said first carrier and pinion gear.

14. A transmission in accordance with claim 13 further comprising:
   a second clutch interposed between said second ring gear and said input shaft.

15. A transmission in accordance with claim 11 wherein said planetary gear means comprises:
   a planetary gear unit including a first sun gear, a long pinion meshed with said first sun gear, a short pinion and a ring gear engaged with said long pinion and a second sun gear engaged with said short pinion;
   wherein said transmission further comprises a first clutch interposed between said second sun gear and said input shaft and a second clutch interposed between said first sun gear and said input shaft;
   wherein said ring gear is fixed to said output shaft for rotation therewith; and
   wherein said long pinion and said short pinion are mounted on a common carrier and said carrier is said rotatable reaction force element.

16. A transmission in accordance with claim 15 further comprising a third clutch for connecting said common carrier to said input shaft.

17. A transmission in accordance with claim 11 wherein said planetary gear means comprises:
   a first single planetary gear unit including a first sun gear, a first pinion and carrier and a first ring gear and a second single planetary gear unit including a second sun gear, a second pinion and carrier and a second ring gear;
   a first clutch for selectively engaging said second sun gear with said input shaft;
   a brake for selectively locking said first sun gear against rotation;
   a second clutch for selectively engaging said first sun gear with said input shaft;
   a third clutch for selectively connecting said first carrier and said second ring gear to the input shaft;
   wherein said first ring gear and said second carrier are connected in series to said output shaft; and
   wherein said rotatable reaction element is said first carrier, said first carrier being connected to said second ring gear for rotation therewith.

18. A transmission in accordance with claim 11 wherein said planetary gear means comprises a first single planetary gear unit including a first sun gear, a first carrier and pinion and a first ring gear, a second single planetary gear unit including a second sun gear, a second carrier and pinion and a second ring gear and a third single planetary gear unit including a third sun gear, a third carrier and pinion and a third ring gear;
   wherein said transmission further comprises:
      a first clutch for selectively connecting said second ring gear and said third sun gear to said input shaft, said second ring gear and said third sun gear being interconnected for rotation together;
      a brake for locking said first and second sun gears against rotation, said first and second sun gears being coaxial and interconnected for rotation together;
      a second clutch for selectively connecting said first and second sun gears to said input shaft;
      a second brake for locking said first carrier against rotation;
   wherein said first ring gear, said second carrier and pinion and said third carrier and pinion are connected in series to said output shaft; and
   wherein said rotatable reaction element is said third ring gear.

* * * * *